(12) United States Patent
Peercy et al.

(10) Patent No.: US 6,578,197 B1
(45) Date of Patent: Jun. 10, 2003

(54) SYSTEM AND METHOD FOR HIGH-SPEED EXECUTION OF GRAPHICS APPLICATION PROGRAMS INCLUDING SHADING LANGUAGE INSTRUCTIONS

(75) Inventors: Mark Peercy, Sunnyvale, CA (US); John M. Airey, Mountain View, CA (US); Jonathan Brandt, Santa Cruz, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 508 days.

(21) Appl. No.: 09/056,683

(22) Filed: Apr. 8, 1998

(51) Int. Cl.[7] ............................................. G06F 9/45
(52) U.S. Cl. ..................... 717/143; 717/140; 717/141; 717/142; 717/144
(58) Field of Search .................................. 717/140–144

(56) References Cited

U.S. PATENT DOCUMENTS 5,815,415 A    9/1998    Bentley et al. ........ 395/500.25

FOREIGN PATENT DOCUMENTS

EP    0 603 095    6/1994    ............. G06F/9/44

OTHER PUBLICATIONS

Brown et al., "Algorithm Animation Using 3D Interactive Graphics", ACM, pp. 93–100, Nov. 1993.*
Corrie et al., "Data Shaders", IEEE, pp. 275–283, 1993.*
Green, M. and Sun, H., "A Language and System for Procedural Modeling and Motion," *IEEE Computer Graphics and Applications*, Nov. 8, 1988, pp. 52–64.
Cook, Robert L., "Shade Trees", *Computer Graphics*, vol. 18, No. 3, Jul. 1984, pp. 223–231.
Fraser et al., "Engineering a Simple, Efficient Code Generator Generator", *ACM Letters on Programming Languages and Systems*, Sep. 1992, pp. 1–13.
Glassner, Andrew S., "Principles of Digital Image Synthesis", vol. Two, Morgan Kaufmann Publishers, Inc., pp. 721–753.
Hanrahan, P. and Jim Lawson, "A Language for Shading and Lighting Calculation", *Computer Graphics*, vol. 24, No. 4, Aug. 1990, pp. 289–298.
Perlin, K., "An Image Synthesizer", *Computer Graphics*, vol. 19, No. 3, Jul. 1985, pp. 287–296.
Watt, A. and Mark Watt, "Advanced Animation and Rendering Techniques: Theory and Practice", Addison–Wesley Publishing Company, pp. 322–3336.

* cited by examiner

Primary Examiner—Gregory Morse
Assistant Examiner—Ted T. Vo
(74) Attorney, Agent, or Firm—Sterne, Kessler, Goldstein & Fox P.L.L.C.

(57) ABSTRACT

A system and method for high-speed execution of graphics application programs, including shading language instructions, that utilize 3D graphics hardware. The method involves expressing a graphics computation in a platform-independent procedural shading expression, converting the expression (i.e., user application program) into an intermediate representation such as a tree, and then translating it into a sequence of parametric shading expressions. The method can alternatively processes the intermediate tree representation using a cost-based, tree-grammar recognizer such as iburg. The result is a platform-specific and least-cost, in terms of the underlying hardware, sequence of parametric shading expressions that realizes the graphics computation. The system and method is useful in translating platform-independent RenderMan™ Shading Language programs into fast-executing, platform-specific OpenGL™ or Direct3D™ executable code.

31 Claims, 6 Drawing Sheets p = t + conv(m)

SYSTEM AND METHOD FOR HIGH-SPEED EXECUTION OF GRAPHICS APPLICATION PROGRAMS INCLUDING SHADING LANGUAGE INSTRUCTIONS

BACKGROUND OF THE INVENTION

1. Field of the Invention

The present invention relates generally to the field of computer graphics, and more specifically to providing a system and method for executing platform-efficient graphics application programs including platform-independent shading language instructions.

2. Related Art

Graphics applications which demand high-quality (photo realistic) shaded rendering (e.g., entertainment industry applications) are typically written using a shading language. Shaded rendering refers to the process of generating a synthetic graphical image of a scene from a mathematical (i.e., geometric and other characteristics) model of the scene, whereas shading refers to the process of computing the light that leaves a point either by self-emission or propagation.

Shading models are mathematical functions that characterize the light leaving a particular point on a surface or in a space. In early development, one was required to select a particular model, characterized by its set of mathematical equations, and select parameters to accomplish rendering. A user was required to intimately know the model and fine tune the parameters to be successful. These models were thus labeled parametric shading models (of which expressions were labeled parametric shading expressions).

Shading languages developed from the need to utilize custom shading models (i.e., a "shader"). A high-level shade tree architecture for building customized shaders was first described in Cook, *Shade Trees*, Computer Graphics (SIGGRAPH '84 Proceedings), H. Christiansen, (Ed.), Vol. 18, No. 3, pp. 223–231 (July 1984), which is incorporated herein by reference in its entirety. Cook described an architecture where the shading process was broken down into a number of basic operations which could be organized in a tree-like structure—generally a directed acyclic graph (DAG). Each tree node is basically a function call and a shade tree language program would pass a standard list of parameters to the shade tree, traverse it in post-order, and expect a final color and opacity value to be returned from the root of the tree.

In Perlin, *An Image Synthesizer*, Computer Graphics (SIGGRAPH '85 Proceedings), Vol. 19, No. 3, pp. 287–296 (July 1985), which is incorporated herein by reference in its entirety, a similar language-based approach to shading was presented where arbitrary expressions generated pictures from pre-computed visibility information. The ideas of Cook and Perlin were combined in Hanrahan et al., *A Language for Shading and Lighting Calculations*, Computer Graphics (SIGGRAPH '90 Proceedings), F. Baskett, (Ed.), Vol. 24, No. 4, pp. 289–298 (Aug.1990), which is incorporated herein by reference in its entirety. The result of that work was the RenderMan™ Shading Language which is well-known in the relevant art. RenderMan™ is described in detail in Upstill, *The Render Man™ Companion,* Addison-Wesley Publishing Co. (USA 1990), which is incorporated herein by reference in its entirety.

It has always been deemed desirable for shading languages to be platform independent. In other words, their designs have aimed to make it more or less possible to port shaded rendering applications among different hardware platforms, without substantially rewriting the source code version of the shading language instructions. To achieve platform independence, shading language instructions are typically handled by compiling and linking the application to software libraries written in a high-level, platform-independent programming language (e.g., the "C" or "C++" programming languages), or by using run-time software interpreters similarly written in a high-level language.

Shading languages, via their abstract high-level procedural shading expressions, typically allow programmers to control the display color and opacity of points within a given surface in a flexible and powerful way. For example, a typical set of RenderMan™ Shading Language instructions for a surface that is to be rendered with constant opacity and color is shown in Table 1.

TABLE 1

```
surface
constant( )
        {
                Oi = Os;
                Ci = Os * Cs;
        }
```

In this simple illustration of a surface shader, the variable Oi represents the surface opacity, and is set to a constant value—Os. Ci represents the output color, and is set to the product of the constants Cs (surface reflectance) and Os.

In another example, shown in Table 2, a "plastic" surface is specified through a more complex series of RenderMan™ shading instructions, which requires taking various lighting-based computations (e.g., diffusion, specular, ambient, etc.) and combining them mathematically.

TABLE 2

```
surface
plastic(
        float Ks=0.5, Kd=0.5, Ka=1, roughness=0.1;
            color specularcolor=1)
        {
        point Nf = faceforward( normalize(N), I );
        point V = normalize(-I);
        Oi = Os;
        Ci = Os * ( Cs * (Ka*ambient( ) + Kd*diffuse(Nf)) +
            specularcolor * Ks * specular(Nf,V,roughness) );
        }
```

Together, these instructions model a plastic surface as a solid medium with microscopic colored particles suspended within it. The specular highlight is assumed to be reflected directly off the surface, and the surface color is assumed to be due to the light entering the medium, reflecting off the suspended particles, and re-emerging.

In any event, the examples contained in Table 1 and Table 2 are standard shaders in the RenderMan™ Shading Language which are easily understood by persons skilled in the relevant art.

A current limitation of executing applications with shaded rendering is that they are painfully slow. Conventional graphics hardware systems can easily take several hours or more to render a single, fully-shaded image frame, for a three-dimensional scene of average complexity. This is currently true even for high-end computer graphics systems containing special purpose 3D graphics hardware such as a state-of-the art Silicon Graphics, Inc.'s Onyx2™ workstations equipped with InfiniteReality graphics. Because shading language instructions are typically compiled and linked using a high-level, platform-independent programming language, the net effect is that the operations required by each shading routine are ultimately handled by the general-purpose microprocessor(s) in the user's computer system. The special-purpose graphics hardware resources in Onyx2™ systems or the like, are simply not tapped.

Furthermore, shading languages, and. graphics application program interfaces (APIs) in general, provide abroad set of primitive commands to specify graphics computations in an ostensibly device-independent manner. However, a limitation of such APIs is that they often allow many distinct, but functionally equivalent, sequences of primitive commands to perform a given computation. The optimal choice, in terms of overall execution time and system resource utilization, among a set of functionally equivalent sequences depends strongly on the underlying hardware or software implementation of the API. This fact undermines the utility of the API as a device abstraction since the programmer must construct distinct sequences for each distinct graphics device in order to achieve optimal performance.

Given the above-described limitations, what is needed is a way of utilizing special purpose graphics hardware resources in order to efficiently execute shaded rendering applications, while preserving the relative platform-independence of such applications. Further, what is needed is a cost-based, run-time compilation system for generating efficient sequences of graphics device commands from an abstract, device-independent computational expression.

SUMMARY OF THE INVENTION

The present invention is a system and method for high-speed execution of graphics application programs, including shading language instructions. The method involves the steps of expressing a graphics computation in a platform-independent procedural shading expression, translating it into an intermediate representation such as a tree and then obtaining a sequence of parametric shading expressions that realizes the graphics computation. In a preferred embodiment, the method of the present invention processes the intermediate tree representation of the graphics computation using a cost-based, tree-grammar recognizer such as iburg. This allows the method of the present invention to further obtain a platform-dependent, efficient sequence of primitive commands that realizes the graphics computation.

One advantage of the present invention is that it can be used to translate programs written in one graphics API into programs written in another graphics API. More specifically, the present invention allows platform-independent Render-Man™ Shading Language programs to be translated into platform-specific OpenGL™ or Direct3D™ programs for faster execution.

Another advantage of the present invention is that the method is compiled rather than interpreted. This is different from other language-based graphics environments. Consequently, the present invention allows re-targeting to different hardware/software implementations and re-targeting to different low-level APIs.

Yet another advantage of the present invention is that it differs from conventional ad hoc graph-based optimizations. In a preferred embodiment of the present invention, iburg is used as a cost-based, tree-grammar recognizer. This allows for a systematic search for an efficient (or least-cost) sequence of primitive commands using well-defined cost functions. This also allows a semi-automated port to new platforms (i.e., a self-calibration procedure) and a mechanism to add user-defined optimizations.

Further features and advantages of the invention as well as the structure and operation of various embodiments of the present invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview

Figure 1:
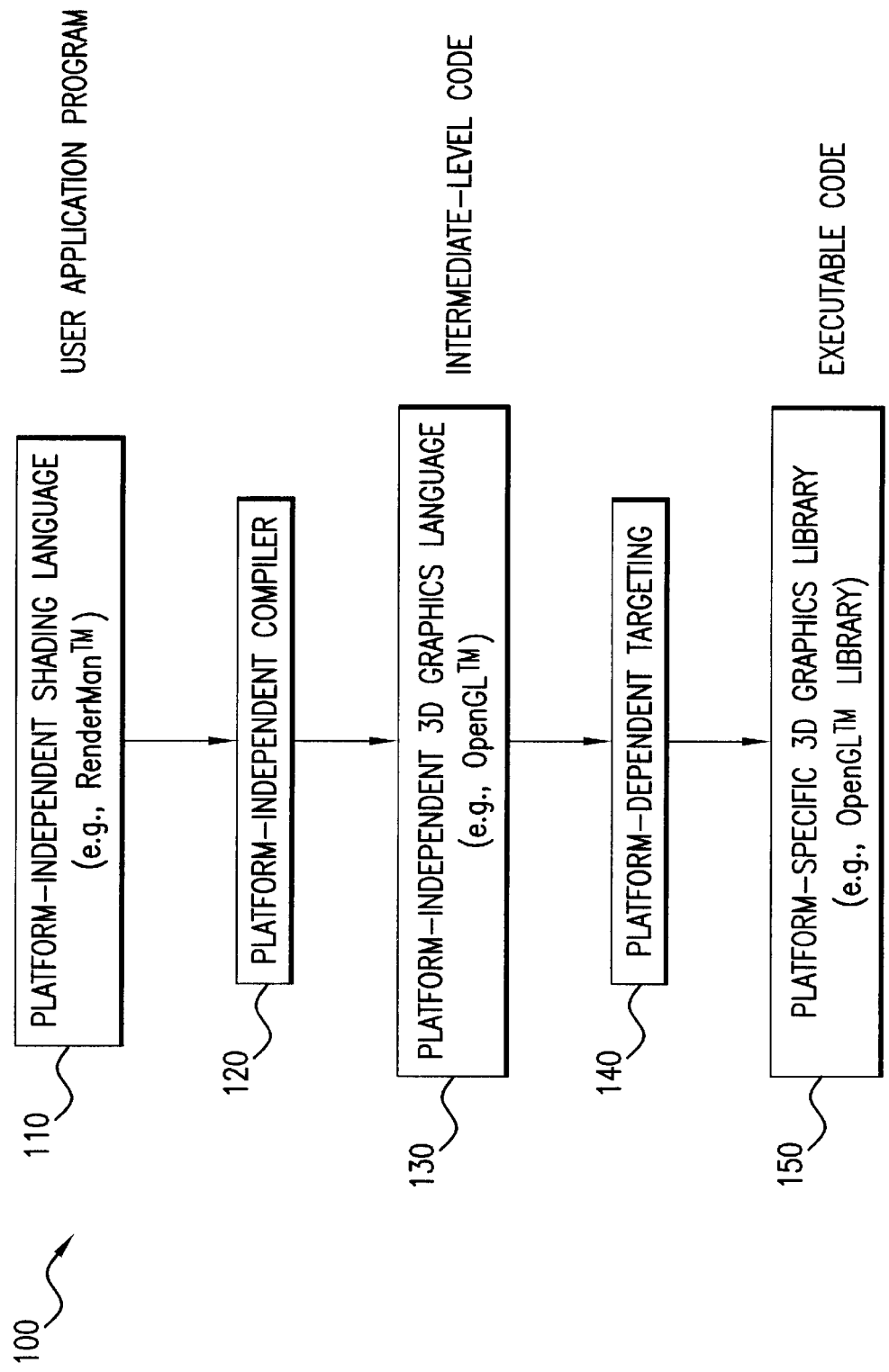
FIG. 1 is a flowchart representing the overall architecture of a preferred embodiment of the present invention.

The present invention provides a significant speed-up in the execution of platform-independent shaded rendering applications, through a new architecture. This inventive approach offers the potential for literally a 100–1000× speed-up in the execution of graphics application programs, including high-quality shading language calls (i.e., procedural shading expressions), without any significant additional hardware cost. Procedural shading language instructions are processed through an initial compilation/translation step, which outputs intermediate code at the level of a hardware abstraction layer. This intermediate code can take the form of parametric shading expressions.

Parametric shading expressions are typically implemented with a machine-independent 3D graphics language (i.e., a language that includes parametric shading expressions) such as the OpenGL™ API. OpenGL™, a software interface to a graphics system, is well-known in the relevant art and is described in detail in Woo et al., *OpenGL Programming Guide: The Official Guide to Learning OpenGL,* Version 1.1, Silicon Graphics, Inc., Addison-Wesley Publishing Co. (USA 1997), which is incorporated herein by reference in its entirety.

In an alternative embodiment, the present invention outputs intermediate code in the Direct3D™ machine-independent graphics language (another software interface to a graphics system similar to OpenGL™). Direct3D™ is also well-known in the relevant art and is described in detail in Glidden, *Graphics Programming with Direct3D: Techniques and Concepts,* Microsoft Corp., Addison-Wesley Publishing Co. (USA 1997).

In a further alternative embodiment, the OpenGL™ code, Direct3D™ code, or the like (e.g., a scene graph library such as IRIS Performer™ that invokes OpenGL™ or Direct3D™ code) can then be compiled in a platform-specific environment (e.g., any machine with OpenGL™ or Direct3D™ libraries), so that the combined advantages of a high-quality shading language, compatibility with a wide range of computer platforms, and optimization for the particular platform, can all be enjoyed.

Currently, there exist no straightforward one-to-one mapping between procedural shading language instructions (e.g., RenderMan™), on the one hand, and an intermediate level, interactive 3D graphics programming language (e.g., OpenGL™), on the other hand.

In Cook, Perlin, and Hanrahan et al., shading is broken into a number of arithmetic, vector, logic, and mathematical operations. Arbitrary shading expressions can be computed by combining these atomic building blocks in various ways. In these previous approaches, parametric shading expressions are considered a subset of arbitrary shading expressions, so they also are computed by piecing together the atomic operations. Perlin, for example, describes on page 287 how the vector dot product is a built-in function in his language, and provides an example of computing the parametric Lambertian (diffuse) illumination model by utilizing pieces consisting of a normal vector, a light vector, the dot product operation, and a red color. Similarly, Table 2 gives a RenderMan™ shader that computes a plastic look. An equivalent computation is commonly expressed as a parametric shading expression in graphics systems without a shading language. The implementations of RenderMan™, however, treat this plastic shader as they do any other shading expression, breaking it down into atomic components and operations, and executing those pieces in a general purpose processor. As with Perlin, the shading expressions are not translated into parametric shading expressions that might be found in OpenGL™ or Direct3D™. The present invention provides a translation into intermediate level code which preferably re-implements the desired shading routine in terms of a multi-pass OpenGL™ rendering process. Further, this translation is preferably performed automatically by a compiler/translator program.

Accordingly, the present invention finds an efficient sequence of graphic API procedures and functions (i.e., software code) that achieves optimal performance regardless of the underlying graphics device (i.e., hardware). Rather than programming directly in terms of the given graphics API, a particular graphics computation is expressed using an abstract representation, such as a programming language expression, shade tree, DAG or the like. The compilation system translates the abstract expression into an intermediate representation, such as a tree representation, using standard par sing techniques.

The tree can then be processed, using a novel cost-based, tree-grammar recognizer. The result of the tree grammar-based processing determines an efficient sequence of primitive commands that realize the abstract computation in terms of the underlying graphics API. The costs that are embedded in the tree-grammar are calibrated to correspond directly to the evaluation cost (in terms of execution time and resource utilization) of the resulting primitive command sequence. The sequence can then be efficiently and repeatedly executed by compiling the sequence and linking it with the appropriate 3D graphics programming language libraries. In a further embodiment, the tree grammar-based processing determines an efficient sequence of primitive commands that is a least-cost sequence. This sequence will realize the abstract computation with the least-cost (i.e., the most efficient) in terms of execution time and resource utilization.

The present invention is described in terms of the above example. This is for convenience only and is not intended to limit the application of the present invention. In fact, after reading the following description, it will be apparent to one skilled in the relevant art how to implement the following invention in alternative embodiments.

System Architecture

As explained above, shading language instructions are typically compiled and linked using a high-level, platform-independent programming language which ultimately execute u sing general-purpose multiprocessors. In order to speed-up such code, the present invention targets it to a specific platform to take advantage of any special-purpose graphics hardware resources available to a user (i.e., application programmer).

Referring to FIG. 1, a platform-efficient graphics application program generator 100 represents the overall architecture of the present invention. Generator 100 begins, at step 110, where a graphics computation is expressed as a procedural shading expression. Such an expression is typically in a platform-independent user application program written in a high-level language (e.g., the "C" programming language) using procedures and functions (i.e., primitives) of a shading language (e.g., RenderMan™). Such a program would be very similar to those shown in Table 1 and Table 2.

In step 120, the application program is compiled into pieces. The use of the term "pieces" simply refers to the fact that the user application program is first parsed before it can be translated. As one skilled in the relevant art will appreciate, a compiler/translator's internal representation of a program will typically be specified by an abstract syntax in terms of categories (i.e., pieces) such as "statement," "expression" and "identifier."

The result of the compilation, is that the application program is transformed, using the pieces, into a sequence of parametric shading expressions at step 130. Such a sequence is typically in a platform-independent 3D graphics language (e.g., OpenGL™ or Direct3D™) code or any other code that corresponds to (either directly or indirectly) or invokes such a platform-independent 3D graphics language. The OpenGL™ or Direct3D™ code is an intermediate-level code which will run on any graphic computer system. In step 140, the platform-independent OpenGL™ code is then targeted to a specific hardware platform. This produces, in step 150, executable code with the same functionality as the high-level code in step 110.

The net effect of generator 100 is that high-level RenderMan™ code is targeted to a specific platform and sped-up. In addition, RenderMan™, and high-level shading languages in general, are infinitely flexible, so that an application programmer cannot make them execute more quickly. Because graphics architectures and systems are very well behaved, these shading languages operate in a "I want it to look this way and don t ask any questions" manner—that is, they are device abstraction utilities. And so, by having a transcription to parametric shading expressions, such as OpenGL™, Direct3D™ and the like, the shading language can then be made to execute more quickly.

Detailed Example of Generator System 100

Figure 2:
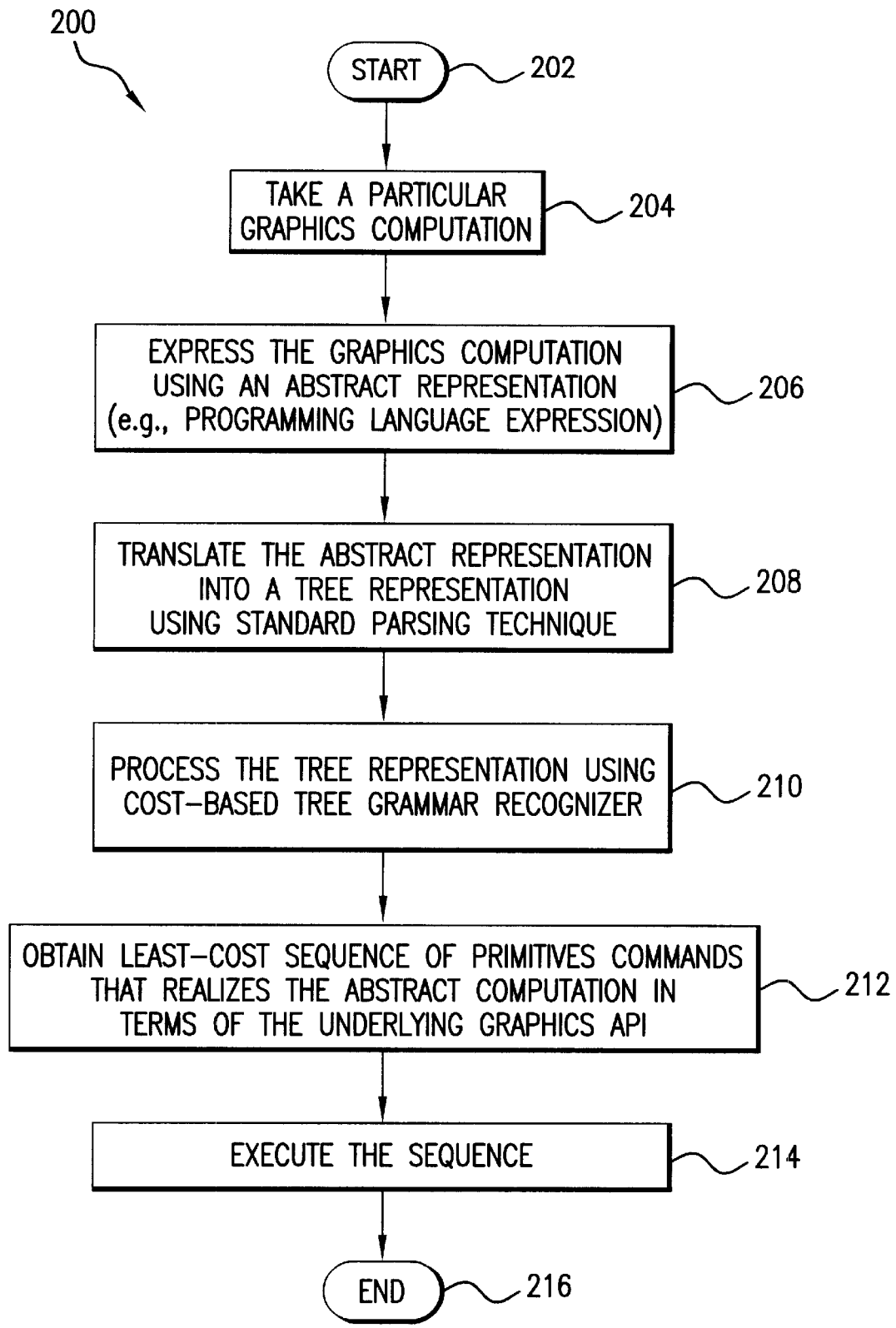
FIG. 2 is a flowchart representing the overall operation according to a preferred embodiment of the present invention.

Referring to FIG. 2, a graphics device command generator 200 illustrates a detailed example of the operation of the present invention (as would operate within the architecture shown in FIG. 1). FIG. 2 also highlights the present invention's usefulness in translating platform-independent RenderMan™ code into fast-executing, platform-dependent OpenGL™ code.

The graphics device command generator 200 begins at step 202 with control passing immediately to step 204. In step 204, a particular graphics computation is first received. For example, a routine that renders a scene involving a pencil's rubber eraser—a "surface rubber( )" routine. In step 206, the "surface rubber( )" graphics computation is expressed using an abstract representation (e.g., a programming language expression) that is device-independent. Table 3 illustrates such a graphics computation.

TABLE 3

```
surface rubber( )
{
    uniform color ttt;
    ttt = mix (color(0.8,0.3,0.3), 1.0, 0.2 *
        texture("texture/noise.bw","_s","t");
    Ci = ttt * (0.2 + diffuse( ));
}
```

The graphics computation is written in a platform-independent user application program (i.e., the high-level "C" programming language) using RenderMan™ Shading Language function and procedure calls (i.e., RenderMan™ primitives shown in bold in Table 3) as will be apparent to one skilled in the relevant art.

A scene rendered by the "surface rubber( )" routine will reflect the fact that a rubber eraser is typically mostly red or pink, but it might also contain little flecks of white from where it has been used. The routine uses the mix command to combine two colors. One color is a constant—say, a pink-eraser color. And the second color is 1.0, which is white. The "mix( )" function then mixes the pink-eraser color and white together in a random way. The randomness is achieved through the "texture( )" function which samples a texture map file "noise.bw" and returns a value between zero and one. If it is zero, pink will result. If it is one, white will result. Thus a pattern will result, using the "diffuse( )" function which sums all light sources over a surface. The pattern will be random across the end of the eraser—some parts will be pink, some, parts will be white.

Figure 3:
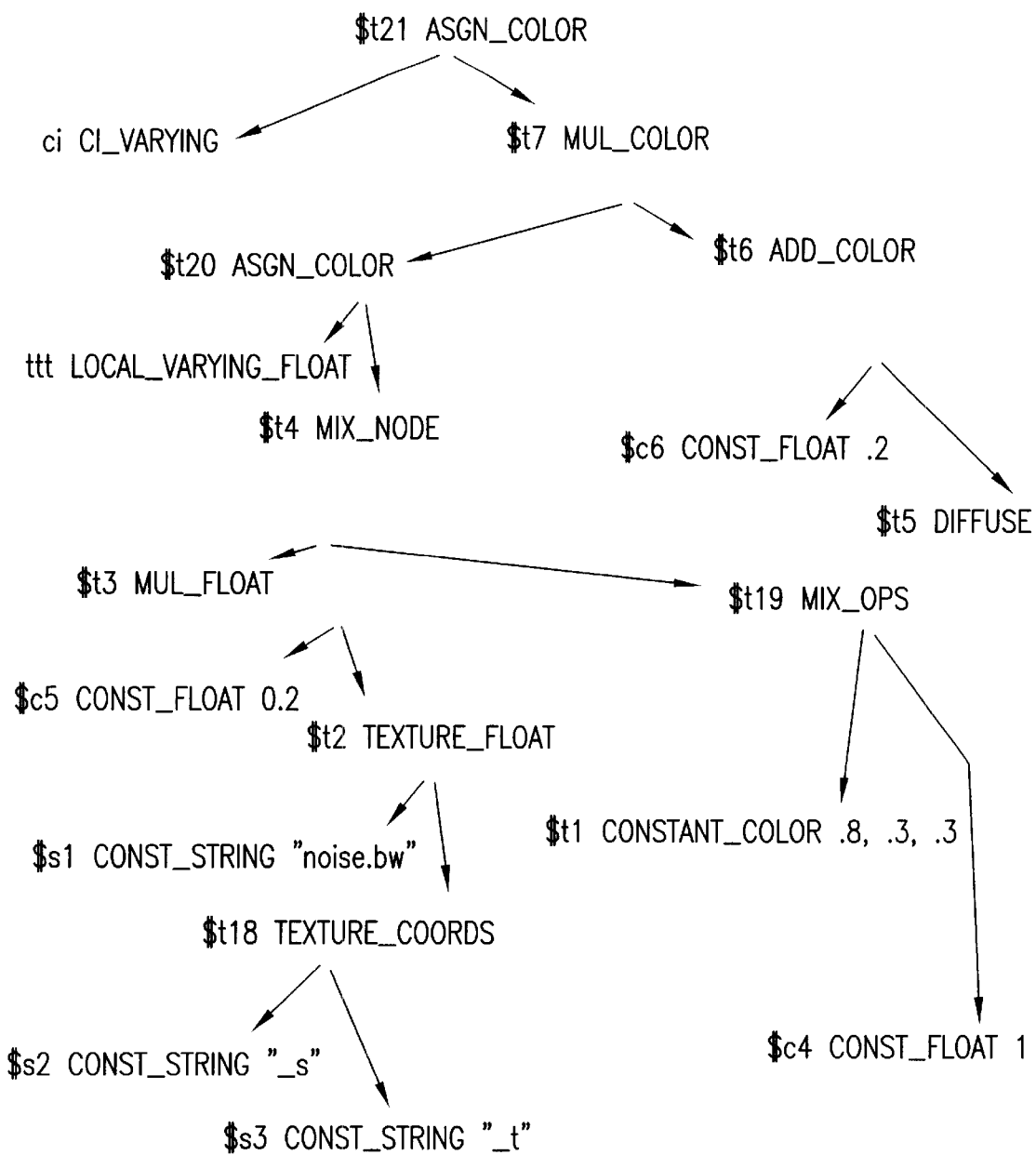
FIG. 3 is a diagram illustrating the tree representation of a graphics computation according to a preferred embodiment of the present invention.
Figure 6:
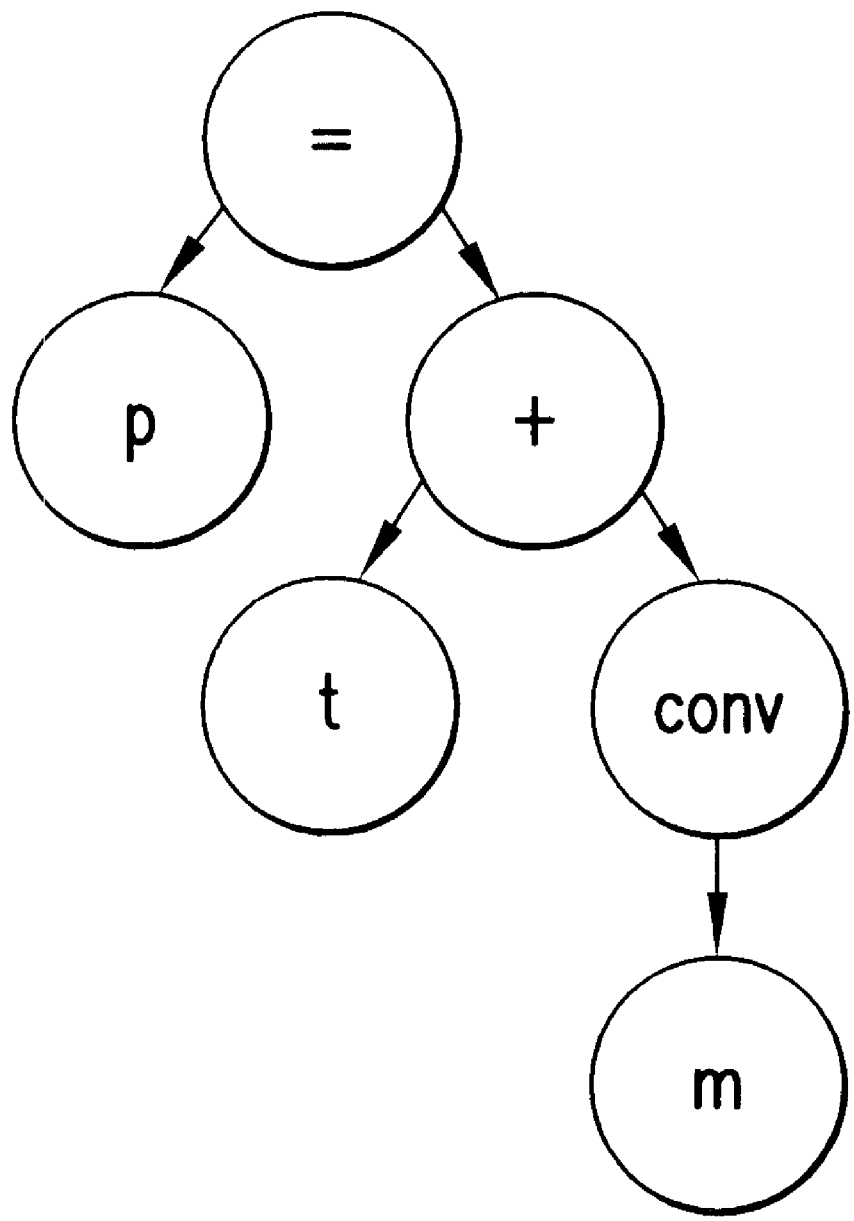
FIG. 6 is a exemplary programming expression parse tree illustrating a method step according to a preferred embodiment of the present invention.

In step 208, the abstract representation from step 206 is translated into a tree representation using standard parsing techniques. This is shown in FIG. 3. As is well-known in the relevant art, a tree representation (typically called an "abstract syntax" or "parse" tree) is a data structure that represents something which has been parsed. It is often used as a compiler/interpreter's internal representation of a program while it is being optimized and from which code generation is performed. For example, a parse tree for the programming language expression "p=t+conv(m)" is shown in FIG. 6.

Returning to FIG. 2, at step 210, the tree representation is processed using a cost-based, tree-grammar recognizer. In a preferred embodiment, the cost-based tree-grammar recognizer used would be iburg. Iburg is a "code generator generator" that was first described in Fraser et al., *Engineering a Simple, Efficient Code Generator Generator*, ACM Letters on Programming Languages and Systems (USA September 1992), which is incorporated herein by reference in its entirety.

Iburg is well-known in the relevant art. However, for completeness, iburg can best be described as a C language program that accepts a tree pattern of a grammar in Backus-Naur Form (BNF) along with associated costs. The present invention's use of iburg as a cost-based, tree-grammar recognizer is novel because it is applied to a graphics API, rather than to a processor instruction set. The costs, in this instance, are the execution times and resource utilization of the resulting graphics API primitive commands based on the targeted platform.

As is also well-known in the relevant art, BNF is one of the most commonly used metasyntactic notations for specifying the syntax of programming languages, command sets, and the like. Rules can be terminals or non-terminals. For example, the syntax of a binary number can be expressed as:

Rule 1: binary_number=bit [binary_number]
Rule 2: bit="0"|"1"

Rule 1 expresses that a binary number (a non-terminal rule) is a bit (a terminal rule) optionally followed by a binary number. Rule 2 expresses that a bit is a literal zero ("0") or one ("1") digit. Thus, any binary number can be constructed using combinations of rules 1 and 2. Similarly, the RenderMan™ command set, or any other graphics API, shading language, etc., can be specified in BNF form to enable command generator 200 to properly operate.

Figure 4:
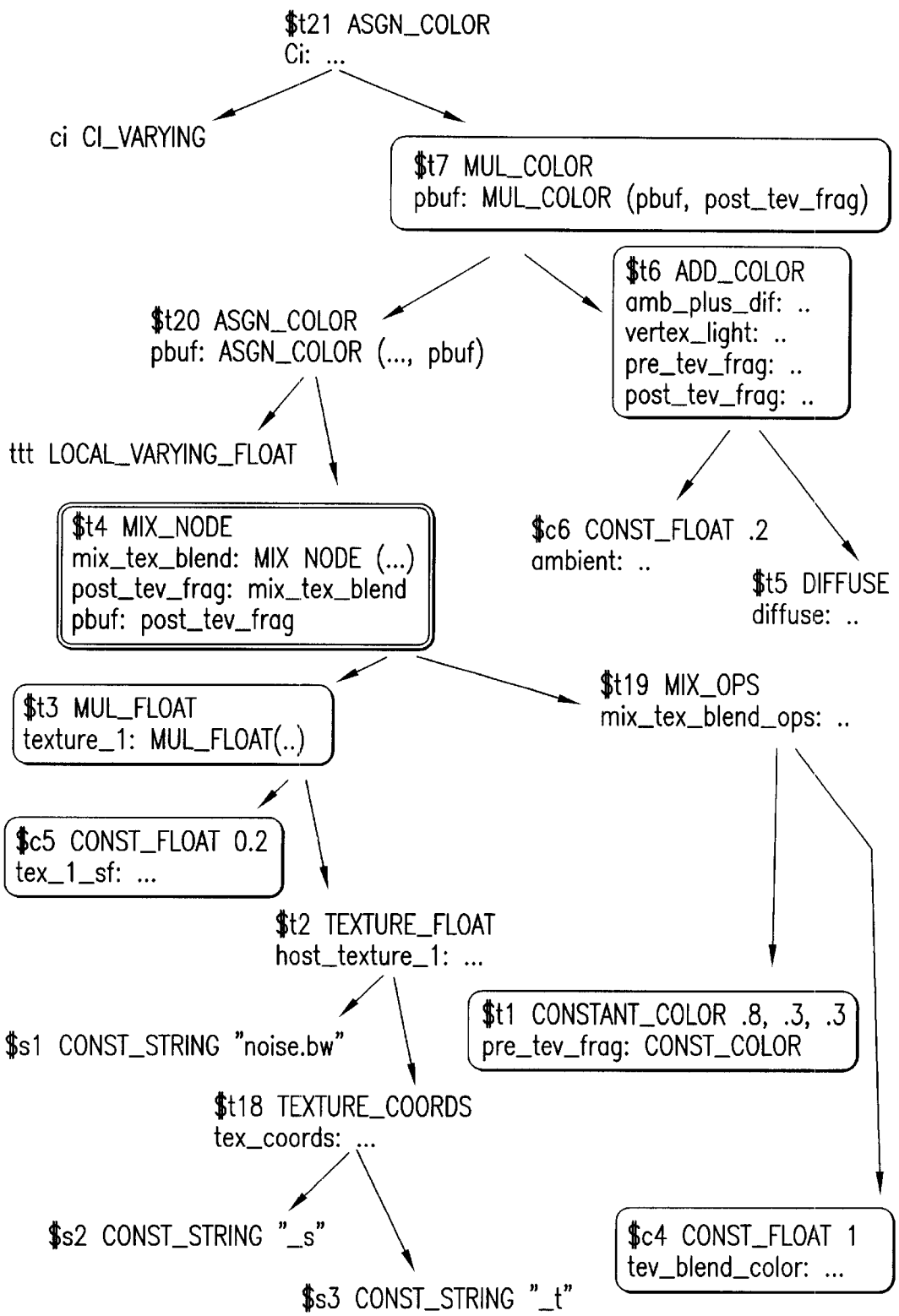
FIG. 4 is a diagram illustrating the tree representation of FIG. 3 after processing according to a preferred embodiment of the present invention.

Iburg then does tree pattern matching to produce hard code that does dynamic programming at compile time. The present invention makes a change to iburg's costs processing in order to improve performance which is described below. In any event, the tree of FIG. 3, having been processed by iburg, is shown in FIG. 4. The tree representation in FIG. 4 reflects the product of standard parsing techniques and the labels on the tree identify the least-cost labeling from iburg that can be used to emit the least-cost translation. The platform-dependent targeting (as shown in step 140 of FIG. 1) is thus accomplished by making use of the costs defined when specifying the BNF for RenderMan™ and the iburg processing. The input into iburg with associated costs for an exemplary platform is shown in Appendix A and a representation of the C code that drives the translation is shown in Appendix B.

Returning to FIG. 2, in step 212, the processing of step 210 results in an efficient sequence of procedure and function calls (i.e., primitives) that realizes the abstract computation in terms of the underlying graphics API. In a preferred embodiment, the underlying graphics API is OpenGL™ to complete the RenderMan™ to OpenGL™ translation. Appendix C shows exemplary platform-specific, fast-executing OpenGL™ source code that results in step 212 from the original RenderMan™ code shown in Table 3. In an alternative embodiment, step 212 not only produces an efficient sequence of procedures and functions, but a least-cost one by utilizing the cost functions of iburg.

Finally, in step 214, the sequence of procedures and functions is executed by running the text from Appendix C through a C compiler and linking it with the appropriate OpenGL™ libraries. The graphics computation (i.e., the "surface_rubber( )" routine) is thus achieved and the graphics device command generator 200 ends at step 216.

Translation Details

Above, graphics device command generator 200 (as shown in FIG. 2) illustrates how procedural RenderMan™ shading language code can be translated to parametric OpenGL™ code. More specifically, the code in Appendix B, using the input of Table 3, generates the output in Appendix C from the iburg control file in Appendix A. A more detailed explanation of the translation (i.e., steps 208–212) is now presented.

First, the text from Appendix A is parsed into a parse tree data structure as shown in FIG. 3. This step is completed by the "readquads(argv[1],&s)" function called from the high-level C programming language "main( )" control function. Any standard parsing technique can be used. Common parsing tools include yacc (found on most Unix systems) or bison (GNU's version of yacc), which are both well-known in the relevant art.

At this point, any typical other parsing work can now be done. In this example, variable usage information is computed by passing the "nextuse( )" function reference to a function "walkpreorder" which is invoked on each node of the tree in pre-order. This step would be performed whether iburg or a more naive translation technology were being employed.

Next, the computation required by the iburg method is performed. This annotates the parse tree data structure shown in FIG. 3 and produce the parse tree data structure shown in FIG. 4. A labeling of the parse tree data structure is computed with the "label( )" function which simply calls the "burm_label( )" function as suggested in Fraser el al. This is known as computing a "cover." There are now rules associated with each node in the parse tree data structure, however they are in a table-based form as detailed in Fraser et aL and the only way they can be accessed is in a top down (i.e., in-order) traversal.

To emit the appropriate output, the tree must be traversed in post-order during the output generation phase and access the rule information for each node. There are a number of ways to do this. In a preferred embodiment, the parse tree is traversed in a pre-order fashion with the "reduce( )" function while storing the data associated with the nodes in the parse tree. The pre-order "reduce( )" function is also detailed in Fraser et al.

Next, header information is computed for the output shader. This is information shared by all the output. Then, the annotated parse tree, shown in FIG. 4 is traversed in post-order and the "visit( )" function is called for each node. The rules stored with the node are consulted and the appropriate output is then printed. Finally, a trailer is printed for the output. This information is also shared by all the output. At this stage, the output consists of a C programming language function with calls to OpenGL™ which implement the procedural shading description listed in Table 3 with the parametric shading primitives that appear in Appendix C.

For purposes of comparison, Appendix D shows output generated from a naive translator that does not use any iburg technology. It produces far more OpenGL™ code, particularly for the "mix( )" operator and thus is less efficient as one skilled in the relevant art would appreciate. Such a program simply emits code for each node of the parse tree as it is computed without regard for how the node appears in the parse tree or whether a more efficient encoding exists given that information. Note that the number of drawing passes in Appendix C is two whereas the number of drawing passes in Appendix D is fourteen.

Changes to Iburg to Implement the Present Invention

First, it is important to note that the use of iburg in the present invention is simply an enhancement of the graphics device command generator 200. The use of iburg allows the "cheaper" (i.e., the lesser-cost in terms of the underlying hardware) OpenGL™ command to be picked during the translation and thus an efficient (or least-cost) sequence to be obtained in step 212. However, the graphics device command generator 200 can be configured to always pick a certain primitive command over another and thus eliminate the use of the iburg altogether. This would result in a sequence of OpenGL™ procedure and function calls, in step 212, that achieve the rendering expressed in RenderMan™, but not necessarily a least-cost or even an efficient one (e.g., Appendix D).

As mentioned above, the present invention makes a change to standard iburg in order to improve performance. Iburg is a tree-grammar parser with costs. The costs are used to select among multiple ambiguous labeling (parsings) of an input tree. See Appendix A. Iburg allows only constant, integer-valued costs.

So an iburg rule resembles:

non-terminal: tree ruleNumber (cost);

The cost term is non-negative and implicitly incremental. That is:

cost(non-terminal)=cost+cost(tree)

The present invention modifies iburg (or can employ a different algorithm) to allow the incremental cost to be a function of the rule's right-hand side elements and their attributes. There are two reasons for this—one is for convenience and the other is by necessity.

First, for convenience, it is desirable to keep the overall number of rules as small as possible as this also affects performance. If the constant costs of iburg are used, a combinatorial explosion of rules to express the costs of all the different pixel pipe configurations, for instance, would result. If instead, the cost is a function of the right-hand side elements, then the number of rules to express a pixel pipe can be reduced to be the number of stages in the pixel pipe (rather than $2^{number\ of\ stages}$). The cost of enabling a particular stage in the pixel pipe is then expressed as a function of the already enabled stages.

Second, by necessity, the cost should be a function of run-time attributes such as tile size, data type, and so forth. If this is not done, it is impossible to select a guaranteed least-cost path through the hardware, and instead some sort of least-average-cost path will be selected. Since the execution speed for pixel operations on many graphics devices (hardware) is highly variable and dependent on run-time attributes such as tile size, a least-average-cost evaluation is not very indicative of the true cost of the operation.

Environment

Figure 5:
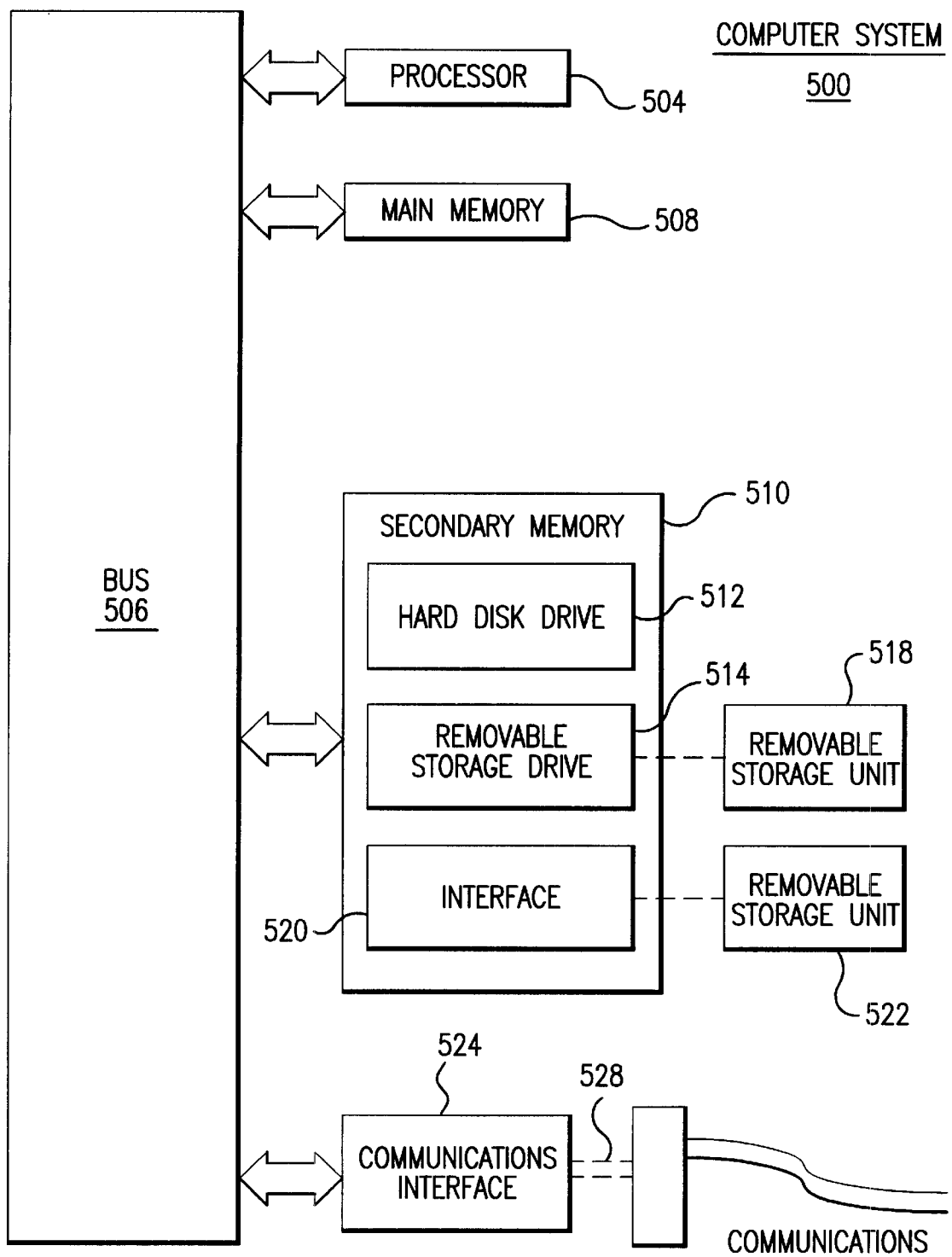
FIG. 5 is a block diagram of an exemplary computer system useful for implementing the present invention.

The present invention may be implemented using hardware, software or a combination thereof and may be implemented in a computer system or other processing system. In fact, in one embodiment, the invention is directed toward a computer system capable of carrying out the functionality described herein. An example of a computer system 500 is shown in FIG. 5. The computer system 500 includes one or more processors, such as processor 504. The processor 504 is connected to a communication bus 506. Various software embodiments are described in terms of this example computer system. After reading this description, it will become apparent to a person skilled in the relevant art how to implement the invention using other computer systems and/or computer architectures.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can,include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Examples of communications interface 524 can include a modem, a network interface (such as an Ethernet card), a communications port, a PCM-CIA slot and card, etc. Software and data transferred via communications interface 524 are in the form of signals 528 which can be electronic, electromagnetic, optical or other signals capable of being received by communications interface 524. These signals 528 are provided to communications interface 524 via a communications path (i.e., channel) 526. This channel 526 carries signals 528 and can be implemented using wire or cable, fiber optics, a phone line, a cellular phone link, an RF link and other communications channels.

In this document, the terms "computer program medium" and "computer usable medium" are used to generally refer to media such as removable storage drive 514, a hard disk installed in hard disk drive 512, and signals 528. These computer program products are means for providing software to computer system 500.

Computer programs (also called computer control logic) are stored in main memory 508 and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

The computer system 500, which would contain the appropriate RenderMan™ and OpenGL™ libraries, is simply recited as an example which can support the present invention. Of course, such an OpenGL™ graphics API architecture system would not necessarily have to include the present invention in order to operate. In other words, an OpenGL™ graphics API architecture can provide rendering without using the advantages of the present invention as described herein. Thus, OpenGL™ licence holders under their license agreements would not automatically be entitled to use the invention.

Furthermore, while various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

APPENDIX A

IBURG INPUT

| | | |
|---|---|---|
| %% | | |
| Ci: | ASGN_COLOR(CI_VARYING.pbuf) | = 1 ( 0); |
| pbuf: | MUL_COLOR(pbuf,pbuf) | = 2 ( 1); |
| pbuf: | ADD_COLOR(pbuf,pbuf) | = 3 ( 1); |
| pbuf: | MUL_COLOR(pbuf,post_tev_frag) | = 4 ( 1); |
| pbuf: | ADD_COLOR(pbuf,post_tev_frag) | = 5 ( 1); |
| pbuf: | post_tev_frag | = 6 ( 1); |
| pbuf: | ASGN_COLOR(LOCAL_VARYING_COLOR,pbuf) | = 7 ( 1); |
| pbuf: | ASGN_COLOR(LOCAL_VARYING_FLOAT,pbuf) | = 8 ( 1); |
| post_tev_frag: | pre_tev_frag_ | = 9 ( 0); |
| post_tev_frag: | mix_tex_blend | = 10 ( 0); |
| post_tev_frag: | texture_1 | = 11 ( 0); |
| pre_tev_frag: | vertex_light | = 12 ( 0); |
| pre_tev_frag: | CONST_COLOR | = 13 ( 0); |
| pre_tev_frag: | CONST_FLOAT | = 14 ( 0); |
| vertex_light: | ambient | = 15 ( 0); |
| vertex_light: | diffuse | = 16 ( 0); |
| vertex_light: | amb_plus_dif | = 17 ( 0); |
| amb_plus_dif: | ADD_COLOR(ambient,diffuse) | = 18 ( 0); |
| ambient: | CONST_FLOAT | = 19 ( 0); |
| diffuse: | DIFFUSE | = 20 ( 0); |
| mix_tex_blend: | MIX_NODE(texture_1,mix_tex_blend_ops) | = 21 ( 0); |
| mix_tex_blend_ops: | MIX_OPS(pre_tev_frag,tev_glend_color) | = 22 ( 0); |
| texture_1: | MUL_FLOAT(tex_1_sf,host_texture_1) | = 23 ( 1); |
| texture_1: | host_texture_1 | = 24 ( 1); |
| host_texture_1: | TEXTURE_FLOAT(CONST_STRING,tex,_coords) | = 25 ( 0); |
| tex_coords: | TEXTURE_COORDS(CONST_STRING,CONST_STRING) | = 26 ( 0); |
| tex_1_sf: | CONST_FLOAT | = 27 ( 0); |

APPENDIX A-continued

IBURG INPUT

```
tev_blend_color:    CONST_COLOR              = 28 ( 0);
tev_blend_color:    CONST_FLOAT              = 29 ( 0);
%%
```

APPENDIX B

C CODE THAT DRIVES TRANSLATION

```c
void printshaderhead(char *name)
{
    printf("#include \"shadervars.h\"\n\n");
    printf("void %s(TangentSpace *tangent, int xres, int yres)\n",name);
    printf("{\n\
    int i, j, k;\n\
    float table[256];\n\
    float rtable[256];\n\
    float gtable[256];\n\
    float btable[256];\n\
    int nknots;\n\
    static int first = 1;\n\
    float knots[256], rknots[256], gknots[256], bknots[256];\n\
    init_stack(xres,yres);\n\n\
    glMatrixMode(GL_PROJECTION);\n\
    glLoadIdentity( );\n\
    glOrtho(-1; 1, -1, 1, -1, 1 );\n\
    glMatrixMode(GL_MODELVIEW);\n\
    glPushMatrix( );\n\
    glLoadIdentity( );\n\
    glViewport(0,0,xres,yres);\n\n\
    glClear(
GL_COLOR_BUFFER_BIT | GL_DEPTH_BUFFER_BIT ); \n\
    glDisable( GL_TEXTURE_2D );\n\
    glDisable( GL_DEPTH_TEST );\n");
}
void printtrailer(void)
{
    printf("\n\
    glPopMatrix( );\n\
/*glCopyTexImage2DEXT(GL_TEXTURE_2D,0,GL_RGBA8_EXT,
0,0,xres,yres,0);*/\n\
    glReadPixels(0,0,xres,yres,GL_RGBA,GL_UNSIGNED_BYTE,
(void*)RGBATexture[0]);\
glTexImage2D(GL_TEXTURE_2D,0,GL_RGBA8_EXT,xres,yres,
0,GL_RGBA,GL_UNSIGNED_BYTE, (void*)RGBATexture[0]);\n");
    printf("\n    if( firsttime ) firsttime- -;\n}\n");
}
static int Passes;
static int Quadnumber;
void
visit1(Symbol *t, int goalnt)
{
    extern char *burm_opname[ ];
    extern char *burm_string[ ];
    char str0[64];
    char str1[64];
    char str2[64];
    char str3[64];
    int i,j,len;
    sprintf(str0,"(%03d) %s",Quadnumber++,t->name);
    len = strlen(str0);
    if (len < 16) strcpy(str1,"\t");
    sprintf(str2,":= %s",burm_opname[t->op]);
    switch(t->op) {
        case CONST_FLOAT:
          sprintf(str3," %g",t->f[0]);
          break;
        case CONST_COLOR:
        case CONST_POINT:
          sprintf(str3," %g %g %g",t->f[0],t->f[1],t->f[2]);
          break;
```

APPENDIX B-continued

C CODE THAT DRIVES TRANSLATION

```c
        case CONST_STRING:
          sprintf(str3," %s",t->s);
          break;
        default;
          if (LEFT_CHILD(t)) {
            if (!RIGHT_CHILD(t))
              sprintf(str3,"(%s)",LEFT_CHILD(t)->name);
            else
              sprintf(str3,"(%s,%s)",LEFT_CHILD(t)->name,
                                     RIGHT_CHILD(t)->name);
          }
          break;
    }
    /* (xxx) <name> := <operator and operands> */
    printf("/*%s%s%s*s",str0,str1,str2,str3);
#define TABLEN 8
    len = len + strlen(str1)*TABLEN + strlen(str2) +
strlen(str3);
    if    (len <= 2*TABLEN)
        printf("\t\t\t\t\t\t\t");
    else if (len <= 3*TABLEN)
        printf("\t\t\t\t\t\t");
    else if (len <= 4*TABLEN)
        printf("\t\t\t\t\t");
    else if (len <= 5*TABLEN)
        printf("\t\t\t\t");
    else if (len <= 6*TABLEN)
        printf("\t\t\t")
    else if (len <= 7*TABLEN)
        printf("\t\t");
    /* follow with next use info */
    printf("(%s %s %s)",
t->qnextuse[0]->name,t->qnextuse[1]->name,t->qnextuse[2]->name)
;
    printf("(%d %d %d)",
        t->qlive[0],t->qlive[1],t->qlive[2]);
    printf("*/\n");
    /* act on matching rules, if any, in bottom-up order */
    for (i = t->rules; i; - -i) {
        /* print matching rules, if any */
        for (j = 0; j < i-1; j++) printf("   ");
        printf("/* %s */\n",burm_string[t->eruleno[i-1]]);
        switch (t->eruleno[i-1]) {
        case 0 : /*        0, */
          break;
        case 1 : /*        "Ci: ASGN_COLOR(CI_VARYING,pbuf)", */
          break;
        case 2 : /*        "pbuf: MUL_COLOR(pbuf,pbuf)", */
          Passes++;
          break;
        case 3 : /*        "pbuf: ADD_COLOR(pbuf,pbuf)", */
          Passes++;
          break;
        case 4 : /*        "pbuf: MUL_COLOR(pbuf,post_tev_frag)",
*/
          Passes++;
          printf("    glEnable(GL_BLEND);\n");
          printf("    glBlendFunc(GL_DST_COLOR, GL_ZERO);\n");
          printf("\n");
          printf("    for (i=0; i < N-1; i++) {\n");
```

APPENDIX B-continued

C CODE THAT DRIVES TRANSLATION

```
            printf("        glBegin(GL_TRIANGLE_STRIP);\n");
            printf("        for (j=0; j < N; j+ +) {\n");
            printf("\n");
            printf("            glTexCoord2fv(
tangent->texture[i][j]);\n");
            printf("            glColor3fv(
tangent->color[i][j]);\n");
            printf("            glVertex2fv(
tangent->position[i][j]);\n");
            printf("\n");
            printf("            glTexCoord2fv(
tangent->texture[i+1][j]);\n");
            printf("            glColor3fv(
tangent->color[i+1][j]) ;\n");
            printf("            glVertex2fv(
tangent->position[i+1][j]);\n");
            printf("\n");
            printf("        }\n");
            printf("        glEnd( );\n");
            printf("    }\n");
            printf("
glTexEnvf(GL_TEXTURE_ENV,GL_TEXTURE_ENV_MODE,
GL_MODULATE);\n");
            printf("    glDisable(GL_BLEND);\n");
            printf("    glBlendFunc(GL_ONE, GL_ZERO);\n");
            break;
    case 5 : /*      "pbuf: ADD_COLOR(pbuf,post_tev_frag)", 
*/
        Passes+ +;
        break;
    case 6 : /*      "pbuf: post_tev_frag", */
        Passes+ +;
            printf("    for (i=0; i < N-1; i+ +) {\n");
            printf("        glBegin(GL_TRIANGLE_STRIP);\n");
            printf("        for (j=0; j < N; j++) {\n");
            printf("\n");
            printf("            glTexCoord2fv(
tangent->texture[i][j]);\n");
            printf("            glColor3fv(
tangent->color[i][j]);\n");
            printf("            glVertex2fv(
tangent->position[i][j]);\n");
            printf("\n");
            printf("            glTexCoord2fv(
tangent->texture[i+1][j]);\n");
            printf("            glColor3fv(
tangent->color[i+1][j]);\n");
            printf("            glVertex2fv(
tangent->position[i+1][j]);\n");
            printf("\n");
            printf("        }\n");
            printf("        glEnd( );\n");
            printf("    }\n");
            printf("
glTexEnvf(GL_TEXTURE_ENV,GL_TEXTURE_ENV_MODE,
GL_MODULATE);\n");
            printf("    glDisable(GL_TEXTURE_2D); /* XXX might be
unnecessary
*/\n");
            break;
    case 7 : /*      "pbuf:
ASGN_COLOR(LOCAL_VARYING_COLOR,pbuf)", */
        break;
    case 8 : /*      "pbuf:
ASGN_COLOR(LOCAL_VARYING_FLOAT,pbuf)", */
        break;
    case 9 : /*      "post_tev_frag: pre_tev_frag", */
        break;
    case 10 : /*     "post_tev_frag: mix_tex_blend", */
        break;
    case 11 : /*     "post_tev_frag: texture_1", */
        break;
    case 12 : /*     "pre_tev_frag: vertex_light", */
        break;
    case 13 : /*     "pre_tev_frag: CONST_COLOR", */
            printf("    for (i=0; i < N; i+ +) {\n");
            printf("        for (j=0; j < N; j+ +) {\n");
            printf("            tangent->color[i][j][0] =
%g;\n",t->f[0]);
            printf("            tangent->color[i][j][1] =
%g;\n",t->f[1]);
            printf("            tangent->color[i][j][2] =
%g;\n",t->f[2]);
            printf("        }\n");
            printf("    }\n");
        break;
    case 14 : /*     "pre_tev_frag: CONST_FLOAT", */
        break;
    case 15 : /*     "vertex_light: ambient", */
        break;
    case 16 : /*     "vertex_light: diffuse", */
        break;
    case 17 : /*     "vertex_light: amb_plus_dif", */
        break;
    case 18 : /*     "amb_plus_dif:
ADD_COLOR(ambient,diffuse)", */
            printf("    for (i=0; i < N; i+ +) {\n");
            printf("        for (j=0; j < N; j+ +) {\n");
            printf("            tangent->color[i][j][0] =
%g+tangent->light[i][j][2];\n",LEFT_CHILD(t)->f[0]);
            printf("            tangent->color[i][j][1] =
%g+tangent->light[i][j][2];\n",LEFT_CHILD(t)->f[1]);
            printf("            tangent->color[i][j][2] =
%g+tangent->light[i][j][2];\n",LEFT_CHILD(t)->f[2]);
            printf("        }\n");
            printf("    }\n");
        break;
    case 19 : /*     "ambient: CONST_FLOAT", */
        break;
    case 20 : /*     "diffuse: DIFFUSE", */
        break;
    case 21 : /*     "mix_tex_blend:
MIX_NODE(texture_1,mix_tex_blend_ops)",
*/
        printf("
glTexEnvf(GL_TEXTURE_ENV,GL_TEXTURE_ENV_MODE,
GL_BLEND);\n");
        break;
    case 22 : /*     "mix_tex_blend_ops:
MIX_OPS(pre_tev_frag,tev_blend_color)", */
        break;
    case 23 : /*     "texture_1:
MUL_FLOAT(tex_1_sf,host_texture_1)", */
        printf("\n\
for( i=0; i<N; i++ )\n\
    for ( j = 0; j < N; j+ + ) {\n\
        tangent->texture[i][j][0] = %s;\n\
        tangent->texture[i][j][1] = %s;\n\
    }\n",
        LEFT_CHILD(RIGHT_CHILD(RIGHT_CHILD(t)))->s,
        RIGHT_CHILD(RIGHT_CHILD(RIGHT_CHILD(t)))->s);
        printf("
readrgbatexture(\"%s\");\n",LEFT_CHILD(RIGHT_CHILD(t))->s);
        printf("    glPixelTransferf(GL_RED_SCALE,1.0);\n");
        printf("    glPixelTransferf(GL_GREEN_SCALE,1.0);\n");
        printf("    glPixelTransferf(GL_BLUE_SCALE,1.0);\n");
        printf("    glPixelTransferf(GL_ALPHA_SCALE,1.0);\n");
        printf("    glEnable(GL_TEXTURE_2D);\n");
        break;
    case 24 : /*     "texture_1: host_texture_1", */
        break;
    case 25 : /*     "host_texture_1:
TEXTURE_FLOAT(CONST_STRING,tex_coords)", */
        break;
    case 26 : /*     "tex_coords:
```

APPENDIX B-continued

C CODE THAT DRIVES TRANSLATION

```
TEXTURE_COORDS(CONST_STRING,CONST_STRING)", */
      break;
   case 27 : /*      "tex_1_sf: CONST_FLOAT", */
      printf("
glPixelTransferf(GL_RED_SCALE,%g);\n",t->f[0]);
      printf("
glPixelTransferf(GL_GREEN_SCALE,%g);\n",t->f[0]);
      printf("
glPixelTransferf(GL_BLUE_SCALE,%g);\n",t->f[0]);
      printf("
glPixelTransferf(GL_ALPHA_SCALE,%g);\n",t->f[0]);
      break;
   case 28 : /*      "tev_blend_color: CONST_COLOR", */
      break;
   case 29 : /*      "tev_blend_color: CONST_FLOAT", */
      printf("   { float _p[4]; _p[0] = %g; _p[1] = %g; _p[2]
= %g; _p[3] =
1.0;\n",
           t->f[0],t->f[0],t->f[0]);
      printf("
glTexEnvfv(GL_TEXTURE_ENV,
GL_TEXTURE_ENV_COLOR,_p);
}\n",:
      break;
   }
  }
}
void
walkpreorder(Symbol *t, int level, void (*f) (Symbol* t,int
level))
{
   int i;
   if (!t) return;
   (*f) (t,level);
   walkpreorder(LEFT_CHILD(t),level+1,f);
   walkpreorder(RIGHT_CHILD(t),level+1,f);
}
void
walkpostorder(Symbol *t,int level, void (*f) (Symbol *t, int
level))
{
   if (!t) return;
   walkpostorder(LEFT_CHILD(t),level,f);
   walkpostorder(RIGHT_CHILD(t),level,f);
   (*f) (t,level);
}
/* This just calls the IBURG labeling function */
void label(NODEPTR_TYPE p)
{
   if (getenv("TRACE")) BurmTrace = atoi(getenv("TRACE"));
   if (burm_label(p) == 0) {
      fprintf(stdout, "no cover\n");
      exit (1);
   }
   /*
   else
      dumpCover(p, 1, 0);
   */
}
/* reduce tree and store rules in tree node */
void reduce(NODEPTR_TYPE p, int goalnt)
{
   int eruleno;
   short *nts;
   NODEPTR_TYPE kids [2];
   int i;
   extern short *burm_nts[ ];
   eruleno = burm_rule(STATE_LABEL(p), goalnt);
   nts    = burm_nts[eruleno];
   burm_kids(p, eruleno, kids);
   if (p->rules == MAXCHAINRULES) {
      fprintf(stderr, "too many chain rules \n");
      exit (1);
   }
```

APPENDIX B-continued

C CODE THAT DRIVES TRANSLATION

```
   p->eruleno[p->rules++] = eruleno;
   if (nts[0]){
      reduce (kids [0], nts[0]);
   }
   if (nts[1]) {
      reduce(kids[1], nts[1]);
   }
}
void
main(int argc, char **argv)
{
   Shader s;
   readquads(argv[1],&s);
   /* compute next use info */
   walkpreorder(LINK(HEAD(&s),0),0,nextuse);
   /* do basic iburg processing */
   label(LINK(HEAD(&s),0));
   reduce(LINK(HEAD(&s),0),1);
   printshaderhead(s.name);
   /* number nodes (quads) and print to help debug */
   /* emit code */
   walkpostorder(LINK(HEAD(&s),0),1,visit1);
   /* n = evaltree(&s); *//* old naive code emitter */
   printtrailer( );
   fprintf(stderr," Number of Passes: %d\n",Passes);
   exit(0)
}
```

APPENDIX C

OPENGL ™ TRANSLATION OUTPUT (USING IBURG)

```
#include "shadevars.h"
void rubber(TangentSpace *tangent, int xres, int yres)
}
   int i, j, k;
   float table[256];
   float rtable[256];
   float gtable[256];
   float btable[256];
   int nknots;
   static int first = 1;
   float knots[256], rknots[256], gknots[256], bknots[256];
   init_stack(xres,yres);
   glMatrixMode(GL_PROJECTION);
   glLoadIdentity( );
   glOrtho(-1, 1, -1, 1, -1, 1 );
   glMatrixMode(GL_MODELVIEW);
   glPushMatrix( );
   glLoadIdentity( );
   glViewport(0,0,xres,yres);
   glClear(
GL_COLOR_BUFFER_BIT | GL_DEPTH_BUFFER_BIT );
   glDisable( GL_TEXTURE_2D );
   glDisable( GL_DEPTH_TEST );
/*(000) Ci := CI_VARYING                     ($T21 (null)
(null))(1
0 0)*/
/*(001) ttt := LOCAL_VARYING_FLOAT           ($T20 (null)
(null))(1
0 0)*/
/*(002) $C5 := CONST_FLOAT 0.2               ($T3 (null)
(null))(1 0
0)*/
/* tex_1_sf: CONST FLOAT */
   glPixelTransferf(GL_RED_SCALE,0.2);
   glPixelTransferf(GL_GREEN_SCALE,0.2);
   glPixelTransferf(GL_BLUE_SCALE,0.2);
   glPixelTransferf(GL_ALPHA_SCALE,0.2);
/*(003) $S1 := CONST_STRING textures/noise.bw ($T2 (null)
(null))(1 0
0)*/
```

APPENDIX C-continued

OPENGL ™ TRANSLATION OUTPUT (USING IBURG)

```
/*(004) $S2 := CONST_STRING _s           ($T18 (null)
(null))(1
0 0)*/
/*(005) $S3 := CONST_STRING _t           ($T18 (null)
(null))(1
0 0)*/
/*(006) $T18 := TEXTURE_COORDS($S2,$S3)  ($T2
(null) (null))(1 0
0)*/
/* tex_coords: TEXTURE_COORDS(CONST_STRING,
CONST_STRING) */
/*(007) $T2 := TEXTURE_FLOAT($S1,$T18)   ($T3 (null)
(null))(1 0
0)*/
/* host_texture_l:
TEXTURE_FLOAT(CONST_STRING,tex_coords) */
/*(008) $T3 := MUL_FLOAT($C5,$T2)        ($T4 (null)
(null))(1 0
0)*/
/* texture_l: MUL_FLOAT(tex_l_sf,host_texture_l) */
        for( i=0; i<N; i++)
            for ( j = 0; j < N; j++ ) {
                tangent->texture[i][j][0] = _s;
                tangent->texture[i][j][1] = _t;
            }
        readrgbatexture ("textures/noise.bw");
        glPixelTransferf(GL_RED_SCALE,1.0);
        glPixelTransferf(GL_GREEN_SCALE,1.0);
        glPixelTransferf(GL_BLUE_SCALE,1.0);
        glPixelTransferf(GL_ALPHA_SCALE,1.0);
        glEnable(GL_TEXTURE_2D);
/*(009) $T1 := CONST_COLOR 0.8 0.3 0.3   ($T19 (null)
(null))(1
0 0)*/
/* pre_tev_frag: CONST_COLOR */
        for (i=0; i < N; i++) {
            for (j=0; j < N; j++) {
                tangent->color[i][j][0] = 0.8;
                tangent->color[i][j][1] = 0.3;
                tangent->color[i][j][2] = 0.3;
            }
        }
/*(010) $C4 := CONST_FLOAT 1             ($T19 (null)
(null))(1
0 0)*/
/* tev_blend_color: CONST_FLOAT */
        { float _p[4]; _p[0] = 1; _p[1] = 1; _p[2] = 1; _p[3] =
1.0;
        glTexEnvfv(GL_TEXTURE_ENV,
GL_TEXTURE_ENV_COLOR,_p); }
/*(011) $T19   := MIX_OPS($T1,$C4)       ($T4
(null) (null))(1 0
0)*/
/* mix_tex_blend_ops:
MIX_OPS(pre_tev_frag,tev_blend_color) */
/*(012) $T4 := MIX_NODE($T3,$T19)        ($T20 (null)
(null))(1
0 0)*/
        /* mix_tex_blend:
MIX_NODE(texture_l,mix_tex_blend_ops)
*/
        glTexEnvf(GL_TEXTURE_ENV,
GL_TEXTURE_ENV_MODE,GL_BLEND);
        /* post_tev_frag: mix_tex_blend */
/* pbuf: post_tev_frag */
        for (i=0; i < N-1; i++) {
            glBegin(GL_TRIANGLE_STRIP);
            for (j=0; j < N; j++) {
                glTexCoord2fv( tangent->texture[i][j]);
                glColor3fv(     tangent->color[i][j]);
                glVertex2fv(    tangent->position[i][j]);
                glTexCoord2fv( tangent->texture[i+1][j]);
                glColor3fv(     tangent->color[i+1][j]);
                glVertex2fv(    tangent->position[i+1][j]);
            }
            glEnd( );
        }
        glTexEnvf(GL_TEXTURE_ENV,
GL_TEXTURE_ENV_MODE,GL_MODULATE);
        glDisable(GL_TEXTURE_2D);
        /* XXX might be unnecessary */
/*(013) $T20     := ASGN_COLOR(ttt,$T4)  ($T7
(null) (null))(1 0
0)*/
/* pbuf: ASGN_COLOR(LOCAL_VARYING_FLOAT,pbuf) */
/*(014) $C6 := CONST_FLOAT 0.2           ($T6 (null)
(null)) (1 0
0)*/
/* ambient: CONST_FLOAT */
/*(015) $T5 := DIFFUSE 0.2               ($T6 (null)
(null)) (1 0
0)*/
/* diffuse: DIFFUSE */
/*(016) $T6 := ADD_COLOR($C6,$T5)        ($T7 (null)
(null))(1 0
0)*/
        /* amb_plus_dif: ADD_COLOR(ambient,diffuse) */
        for (i=0; i < N; i++) {
            for (j=0; j < N; j++) {
                tangent->color[i][j][0] =
0.2+tangent->light[i][j][2];
                tangent->color[i][j][1] =
0.2+tangent->light[i][j][2];
                tangent->color[i][j][2] =
0.2+tangent->light[i][j][2];
            }
        }
        /* vertex_light: amb_plus_dif */
        /* pre_tev_frag: vertex_light */
/* post_tev_frag: pre_tev_frag */
/*(017) $T7 := MUL_COLOR($T20,$T6)       ($T21 (null)
(null))(1
0 0)*/
/* pbuf: MUL_COLOR(pbuf,post_tev_frag) */
        glEnable(GL_BLEND);
        glBlendFunc(GL_DST_COLOR, GL_ZERO);
        for (i=0; i < N-1; i++) {
            glBegin(GL_TRIANGLE_STRIP);
            for (j=0; j < N; j++) {
                glTexCoord2fv( tangent->texture[i][j]);
                glColor3fv(     tangent->color[i][j]);
                glVertex2fv(    tangent->position[i][j]);
                glTexCoord2fv( tangent->texture[i+1][j]);
                glColor3fv(     tangent->color[i+1][j]);
                glVertex2fv(    tangent->position[i+1][j]);
            }
            glEnd( );
        }
        glDisable(GL_TEXTURE_2D); /* XXX might be unnecessary */
        glTexEnvf(GL_TEXTURE_ENV,
GL_TEXTURE_ENV_MODE,GL_MODULATE);
        glDisable(GL_BLEND);
        glBlendFunc(GL_ONE, GL_ZERO);
/*(018) $T21     := ASGN_COLOR(Ci,$T7)   ((null)
(null)
(null)))(0 0 0)*/
/* Ci: ASGN_COLOR(CI_VARYING,pbuf) */
        glPopMatrix( );
/*glCopyTexImage2DEXT(GL_TEXTURE_2D,0,GL_RGBA8_EXT,
0,0,xres,yres,0);*/
        glReadPixels(0,0,xres,yres,GL_RGBA,GL_UNSIGNED_BYTE,
(void*)RGBATexture[0]);
glTexImage2D(GL_TEXTURE_2D,0,GL_RGBA8_EXT,xres,yres,0,
GL_RGBA,GL_UNSIGNED_BYTE,(void*)RGBATexture[0]);
        /* Note that there are only 2 instances of the equivalent
of DrawPlane or
glDrawPixels
            in this translation due to using the rule selection
methods enabled by
iburg  */
        if( firsttime ) firsttime--;
}
```

APPENDIX D

OPENGL ™ TRANSLATION OUTPUT (WITHOUT IBURG)

```
#include "shadevars.h"
void DrawPlane( TangentSpace *tangent )
{
    int i, j;
    for ( i = 0; i < N-1; i++ ) {
        glBegin(GL_TRIANGLE_STRIP);
        for ( j = 0; j < N; j++ ) {
            glVertex2fv( tangent->position[i][j] );
            glVertex2fv( tangent->position[i+1][j] );
        }
        glEnd( );
    }
}
void DrawTexPlane(TangentSpace *tangent, float *ta)
{
    int i, j;
    float *tb;
    tb = ta+3*N;
    glColor3f(1.,1.,1.);
    for ( i = 0; i < N-1; i++ ) {
        glBegin(GL_TRIANGLE_STRIP);
        for ( j = 0; j < N; j++,ta+=3,tb+=3 ) {
            glTexCoord2fv(ta);
            glVertex2fv( tangent->position[i][j] );
            glTexCoord2fv(tb);
            glVertex2fv( tangent->position[i+1][j] );
        }
        glEnd( );
    }
}
void rubber(TangentSpace *tangent, int xres, int yres)
{
    int i, j, k;
    float table[256];
    float rtable[256];
    float gtable[256];
    float btable[256];
    int nknots;
    static int first = 1;
    float knots[256], rknots[256], gknots[256], bknots[256];
    init_stack(xres,yres);
    glMatrixMode(GL_PROJECTION);
    glLoadIdentity( );
    glOrtho(-1, 1, -1, 1, -1, 1 );
    glMatrixMode(GL_MODELVIEW);
    glPushMatrix( );
    glLoadIdentity( );
    glViewport(0,0,xres,yres);
    glClear(
    GL_COLOR_BUFFER_BIT | GL_DEPTH_BUFFER_BIT );
    glDisable( GL_TEXTURE_2D );
    glDisable( GL_DEPTH_TEST );
    /* color { */
    glColor3f(0.800000,0.300000,0.300000);
    DrawPlane(tangent);
    glReadPixels(0, 0, xres, yres, GL_RGBA,
    GL_UNSIGNED_BYTE,
            (void *)RGBATexture[1]);
    /* } color */
    /* _texture: name=textures/noise.bw s=_s t=_t { */
    for( i=0; i<N; i++)
        for ( j = 0; j < N; j++) {
            tangent->texture[i][j][0] = _s;
            tangent->texture[i][j][1] = _t;
        }
    readrgbatexture("textures/noise.bw");
    glEnable(GL_TEXTURE_2D);
    glColor3f(1.0,1.0,1.0);
    DrawTexPlane(tangent,(float *)tangent->texture);
    glDisable(GL_TEXTURE_2D);
    glReadPixels(0, 0, xres, yres, GL_RGBA,
    GL_UNSIGNED_BYTE,
            (void *)RGBATexture[2]);
    /* } _texture: name=textures/noise.bw s=_s t=_t */
    /* mul { */
    glDrawPixels(xres,yres,GL_RGBA,GL_UNSIGNED_BYTE,
            (void *)RGBATexture[2]);
    glEnable( GL_BLEND );
    glBlendFunc( GL_DST_COLOR, GL_ZERO );
    glColor3f(0.200000,0.200000,0.200000);
    DrawPlane(tangent);
    glDisable( GL_BLEND );
    glBlendFunc( GL_ONE, GL_ZERO );
    glReadPixels(0, 0, xres, yres, GL_RGBA,
    GL_UNSIGNED_BYTE,
            (void *)RGBATexture[3]);
    /* } mul */
    /* mix { */
    glDrawPixels(xres,yres,GL_RGBA,GL_UNSIGNED_BYTE,
            (void *)RGBATexture[1]);
    glAccum( GL_LOAD, 1.0 );
    glEnable( GL_BLEND );
    glBlendFunc( GL_DST_COLOR, GL_ZERO );
    glDrawPixels(xres,yres,GL_RGBA,GL_UNSIGNED_BYTE,
            (void *)RGBATexture[3]);
    glBlendFunc( GL_ONE, GL_ZERO );
    glAccum( GL_ACCUM, -1.0 );
    glDrawPixels(xres,yres,GL_RGBA,GL_UNSIGNED_BYTE,
            (void *)RGBATexture[3]);
    glBlendFunc( GL_DST_COLOR, GL_ZERO );
    glColor3f(1.000000,1.000000,1.000000);
    DrawPlane(tangent);
    glBlendFunc( GL_ONE, GL_ZERO );
    glDisable( GL_BLEND );
    glAccum( GL_ACCUM, 1.0 );
    glAccum( GL_RETURN, 1.0 );
    glReadPixels(0, 0, xres, yres, GL_RGBA,
    GL_UNSIGNED_BYTE,
            (void *)RGBATexture[4]);
    /* } mix */
    /* assign { */
    bcopy)RGBATexture[4],RGBATexture[5],4*xres*yres*sizeof(float));
    /* } assign */
    /* diffuse( ) { */
    DrawFloatPlane(tangent,(float *)tangent->light+2);
    glReadPixels(0, 0, xres, yres, GL_RGBA,
    GL_UNSIGNED_BYTE,
            (void *)RGBATexture[6]);
    /* } diffuse( ) */
    /* add { */
    glDrawPixels(xres,yres,GL_RGBA,GL_UNSIGNED_BYTE,
            (void *)RGBATexture[6]);
    glEnable( GL_BLEND );
    glBlendFunc( GL_ONE, GL_ONE );
    glColor3f(0.200000,0.200000,0.200000);
    DrawPlane(tangent);
    glDisable( GL_BLEND );
    glBlendFunc( GL_ONE, GL_ZERO );
    glReadPixels(0, 0, xres, yres, GL_RGBA,
    GL_UNSIGNED_BYTE,
            (void *)RGBATexture[7]);
    /* } add */
    /* mul { */
    glDrawPixels(xres,yres,GL_RGBA,GL_UNSIGNED_BYTE,
            (void *)RGBATexture[7]);
    glEnable( GL_BLEND );
    glBlendFunc( GL_DST_COLOR, GL_ZERO );
    glDrawPixels(xres,yres,GL_RGBA,GL_UNSIGNED_BYTE,
            (void *)RGBATexture[5]);
    glDisable( GL_BLEND );
    glBlendFunc( GL_ONE, GL_ZERO );
    glReadPixels(0, 0, xres, yres, GL_RGBA,
    GL_UNSIGNED_BYTE,
            (void *)RGBATexture[8]);
    /* } mul */
    /* assign { */
```

APPENDIX D-continued

OPENGL ™ TRANSLATION
OUTPUT (WITHOUT IBURG)

```
bcopy(RGBATexture[8],RGBATexture[0],4*xres*yres*sizeof(float));
    /* } assign */
    /* Note that there are 14 instances of glDrawPixels or
calls to DrawPlane
*/
    glPopMatrix( );
glTexImage2D(GL_TEXTURE_2D,0,GL_RGBA8_EXT,xres,yres,0,
GL_RGBA,GL_UNSIGNED_BYTE, (void
*)RGBATexture[0]);
    if( firsttime ) firsttime- -;
}
```

What is claimed is:

1. A method for high-speed execution of graphics application programs, comprising the steps of:
    (1) expressing a graphics computation as a procedural shading expression;
    (2) parsing said procedural shading expression into an intermediate representation; and
    (3) converting said intermediate representation into a sequence of procedures and functions that correspond to a software interface to a graphics system;
    wherein said sequence of procedures and functions is a platform-specific sequence of procedures and functions that realizes said graphics computation by utilizing 3D graphics hardware.

2. The method of claim 1, wherein said procedural shading expression is a shader written in a programming language.

3. The method of claim 2, wherein said programming language is the C programming language.

4. The method of claim 2, wherein said programming language is the C++ programming language.

5. The method of claim 1, wherein said procedural shading expression is a shade tree.

6. The method of claim 1, wherein said procedural shading expression is a directed acyclic graph.

7. The method of claim 1, wherein said sequence of procedures and functions that correspond to a software interface to a graphics system comprises a scene graph library.

8. The method of claim 1, wherein said software interface to a graphics system is a platform-independent software interface to a graphics system.

9. The method of claim 2, wherein said intermediate representation is a tree representation.

10. The method of claim 9, wherein step (2) further comprises the step of:
    converting said tree representation into a second tree representation.

11. A method for high-speed execution of graphics application programs, comprising the steps of:
    (1) expressing a graphics computation as a procedural shading expression;
    (2) parsing said procedural shading expression into an intermediate representation; and
    (3) converting said intermediate representation into a sequence of parametric shading expressions;
    wherein said sequence of parametric shading expressions is a platform-specific sequence of procedures and functions that realizes said graphics computation by utilizing 3D graphics hardware.

12. The method of claim 11, wherein said procedural shading expression is a shader written in a programming language.

13. The method of claim 12, wherein said programming language is the C programming language.

14. The method of claim 12, wherein said programming language is the C++ programming language.

15. The method of claim 11, wherein said procedural shading expression is a shade tree.

16. The method of claim 11, wherein said procedural shading expression is a directed acyclic graph.

17. The method of claim 12, wherein step (3) is based on relative costs of different sequences of parametric shading expressions.

18. The method of claim 12, wherein said intermediate representation is a tree representation.

19. The method of claim 18, wherein step (2) further comprises the step of:
    converting said tree representation into a second tree representation.

20. A system for high-speed execution of graphics application programs, comprising:
    means for expressing a graphics computation as a procedural shading expression;
    means for parsing said procedural shading expression into an intermediate representation; and
    means for converting said intermediate representation into a sequence of procedures and functions that correspond to a software interface to a graphics system;
    wherein said sequence of procedures and functions is a platform-specific sequence of procedures and functions that realizes said graphics computation by utilizing 3D graphics hardware.

21. The system of claim 20, wherein said procedural shading expression is a shader written in a programming language.

22. The system of claim 21, wherein said intermediate representation is a tree representation.

23. A system for high-speed execution of graphics application programs, comprising:
    means for expressing a graphics computation as a procedural shading expression;
    means for parsing said procedural shading expression into an intermediate representation; and
    means for converting said intermediate representation into a sequence of parametric shading expressions;
    wherein said sequence of parametric shading expressions is a platform-specific sequence of procedures and functions that realizes said graphics computation by utilizing 3D graphics hardware.

24. The system of claim 23, wherein said procedural shading expression is a shader written in a programming language.

25. The system of claim 24, wherein said intermediate representation is a tree representation.

26. A computer program product comprising a computer usable medium having computer readable program code means embodied in said medium for causing an application program to execute on a computer that provides a system for the high-speed execution of graphics application programs, said computer readable program code means comprising:
    a first computer readable program code means for causing the computer to express a graphics computation as a procedural shading expression;
    a second computer readable program code means for causing the computer to parse said procedural shading expression into an intermediate representation; and a third computer readable program code means for causing the computer to convert said intermediate representation into a sequence of procedures and functions that correspond to a software interface to a graphics system;

wherein said sequence of procedures and functions is a platform-specific sequence of procedures and functions that realizes said graphics computation by utilizing 3D graphics hardware.

27. The computer program product of claim 26, wherein said procedural shading expression is a shader written in a programming language.

28. The computer program product of claim 27, wherein said intermediate representation is a tree representation.

29. A computer program product comprising a computer usable medium having computer readable program code means embodied in said medium for causing an application program to execute on a computer that provides a system for the high-speed execution of graphics application programs, said computer readable program code means comprising:

a first computer readable program code means for causing the computer to express a graphics computation as a procedural shading expression;

a second computer readable program code means for causing the computer to parse said procedural shading expression into an intermediate representation; and a third computer readable program code means for causing the computer to convert said intermediate representation into a sequence of parametric shading expressions;

wherein said sequence of parametric shading expressions is a platform-specific sequence of procedures and functions that realizes said graphics computation by utilizing 3D graphics hardware.

30. The computer program product of claim 29, wherein said procedural shading expression is a shader written in a programming language.

31. The computer program product of claim 30, wherein said intermediate representation is a tree representation.

* * * * *